(12) United States Patent
Lee et al.

(10) Patent No.: US 7,560,846 B2
(45) Date of Patent: Jul. 14, 2009

(54) FLUX BARRIER TYPE SYNCHRONOUS RELUCTANCE MOTOR AND ROTOR THEREOF

(75) Inventors: Kyung-Hoon Lee, Seoul (KR); June-Hee Won, Seoul (KR); Dal-Ho Cheong, Seoul (KR); Jun-Ho Ahn, Seoul (KR); Jae-Yoon Oh, Gwangmyeong (KR)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 11/421,830

(22) Filed: Jun. 2, 2006

(65) Prior Publication Data
US 2006/0284512 A1    Dec. 21, 2006

(30) Foreign Application Priority Data
Jun. 15, 2005    (KR) ...................... 10-2005-0051589

(51) Int. Cl.
*E05B 65/46*    (2006.01)
(52) U.S. Cl. ...................................................... 310/217
(58) Field of Classification Search ................. 310/162, 310/261, 156.53, 156.56, 156.57, 217, 166, 310/168; *H02K 19/10, 19/14*
See application file for complete search history.

(56) References Cited

U.S. PATENT DOCUMENTS 6,769,167 B2 * 8/2004 Lee et al. ...................... 29/596

FOREIGN PATENT DOCUMENTS

KR    20030011185    2/2003

OTHER PUBLICATIONS

English language Abstract of Korean 2003-0011185.

* cited by examiner

*Primary Examiner*—Javaid Nasri
(74) *Attorney, Agent, or Firm*—Ked & Associates, LLP

(57) ABSTRACT

A rotor of a flux barrier type synchronous reluctance motor comprises: a rotation shaft; a rotor core formed as a plurality of steel plates are laminated to one another, the steel plate having a shaft hole for inserting the rotation shaft, a plurality of flux barrier groups spaced from one another in a circumferential direction and having a plurality of flux barriers spaced from one another in a radial direction, and a coupling hole penetratingly-formed between the adjacent two flux barrier groups; and a coupling member inserted into the coupling hole and fixing the steel plate. Accordingly, a fabrication cost and an entire weight of the motor are decreased, and a fabrication process is facilitated with a shortened fabrication time. Also, a large coupling intensity is obtained and a magnetic saturation does not occur, thereby preventing a function degradation of the motor.

18 Claims, 13 Drawing Sheets

FLUX BARRIER TYPE SYNCHRONOUS RELUCTANCE MOTOR AND ROTOR THEREOF

BACKGROUND OF THE INVENTION

1. Field of the Invention

The present invention relates to a flux barrier type synchronous reluctance motor and a rotor thereof, and more particularly, to a flux barrier type synchronous reluctance motor capable of facilitating a fabrication process with a shortened fabrication time and capable of reducing a fabrication cost and an entire weight thereof, and a rotor thereof.

2. Description of the Background Art

As shown in FIGS. 1 and 2, a rotor of the conventional flux barrier type synchronous reluctance motor comprises a rotation shaft 11, and a rotor core 20 rotatably arranged centering around the rotation shaft 11.

The rotor core 20 comprises a core body 21 having a plurality of flux barriers 26, and a filling part 27 formed in each of the flux barriers 26. The core body 21 is formed by laminating a plurality of steel plates 22 having a disc shape to one another. The steel plate 22 is formed of a magnetic member, and is provided with a shaft hole 23 for inserting the rotation shaft 11 at the center thereof. The flux barriers 26 are formed centering around the shaft hole 23. Each of the flux barriers 26 has both ends adjacent to the circumference of the steel plate 22 and a center portion protruding towards the shaft hole 23.

The filling part 27 is formed in each of the flux barriers 26. The filling part 27 is formed by casting, or low-pressure casting, or high-pressure casting a non-magnetic metal member, or by molding metal powder, etc.

However, in the rotor of the conventional flux barrier type synchronous reluctance motor, the filling part 27 is formed by casting, low-pressure casting, or high-pressure casting a non-magnetic metal member, or by molding metal powder, etc. after the core body 21 is formed. Accordingly, each device for performing each process is required, and it takes a lot of time to form the filling part 27, thereby prolonging the entire production time and increasing a production cost.

Furthermore, since the filling part is formed of a non-magnetic metal member, an entire production cost is increased and a weight of the rotor is increased.

BRIEF DESCRIPTION OF THE INVENTION

Therefore, an object of the present invention is to provide a flux barrier type synchronous reluctance motor capable of facilitating a fabrication process with a shortened fabrication time and capable of reducing a fabrication cost and a weight thereof, and a rotor thereof.

To achieve these and other advantages and in accordance with the purpose of the present invention, as embodied and broadly described herein, there is provided a rotor of a flux barrier type synchronous reluctance motor, comprising: a rotation shaft; a rotor core formed as a plurality of steel plates are laminated to one another, the steel plate having a shaft hole for inserting the rotation shaft, a plurality of flux barrier groups spaced from one another in a circumferential direction and having a plurality of flux barriers spaced from one another in a radial direction, and a coupling hole penetratingly-formed between adjacent two flux barrier groups; and a coupling member inserted into the coupling hole and fixing the steel plate.

According to another aspect of the present invention, there is provided a rotor of a flux barrier type synchronous reluctance motor, comprising: a rotation shaft; a rotor core formed as a plurality of steel plates are laminated to one another, the steel plate having a shaft hole for inserting the rotation shaft, a plurality of flux barrier groups spaced from one another in a circumferential direction and having a plurality of flux barriers spaced from one another in a radial direction, and a plurality of coupling holes respectively formed to be tangential to two virtual lines formed along each inner circumference of the two flux barrier groups with the same width corresponding to a half of a distance between the adjacent two flux barrier groups; and a coupling member inserted into the coupling hole and fixing the steel plates.

According to still another aspect of the present invention, there is provided a flux barrier type synchronous reluctance motor, comprising: a stator including a stator core having slots and teeth alternately formed along an inner diameter, and a stator coil wound on the slot; and a rotor including a rotation shaft, a rotor core, and a plurality of coupling members, wherein the rotor core is formed by laminating a plurality of steel plates to one another, the steel plate having a shaft hole for inserting the rotation shaft, a plurality of flux barrier groups spaced from one another in a circumferential direction and having a plurality of flux barriers spaced from one another in a radial direction, and a coupling hole penetratingly-formed between the adjacent two flux barrier groups, and wherein each of the coupling members is inserted into the coupling hole and fixes the steel plates.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. in the drawings.

DETAILED DESCRIPTION OF THE INVENTION

Reference will now be made in detail to the preferred embodiments of the present invention, examples of which are illustrated in the accompanying drawings.

Hereinafter, a flux barrier type synchronous reluctance motor and a rotor thereof according to one embodiment of the present invention will be explained with reference to the attached drawings.

Figure 1:
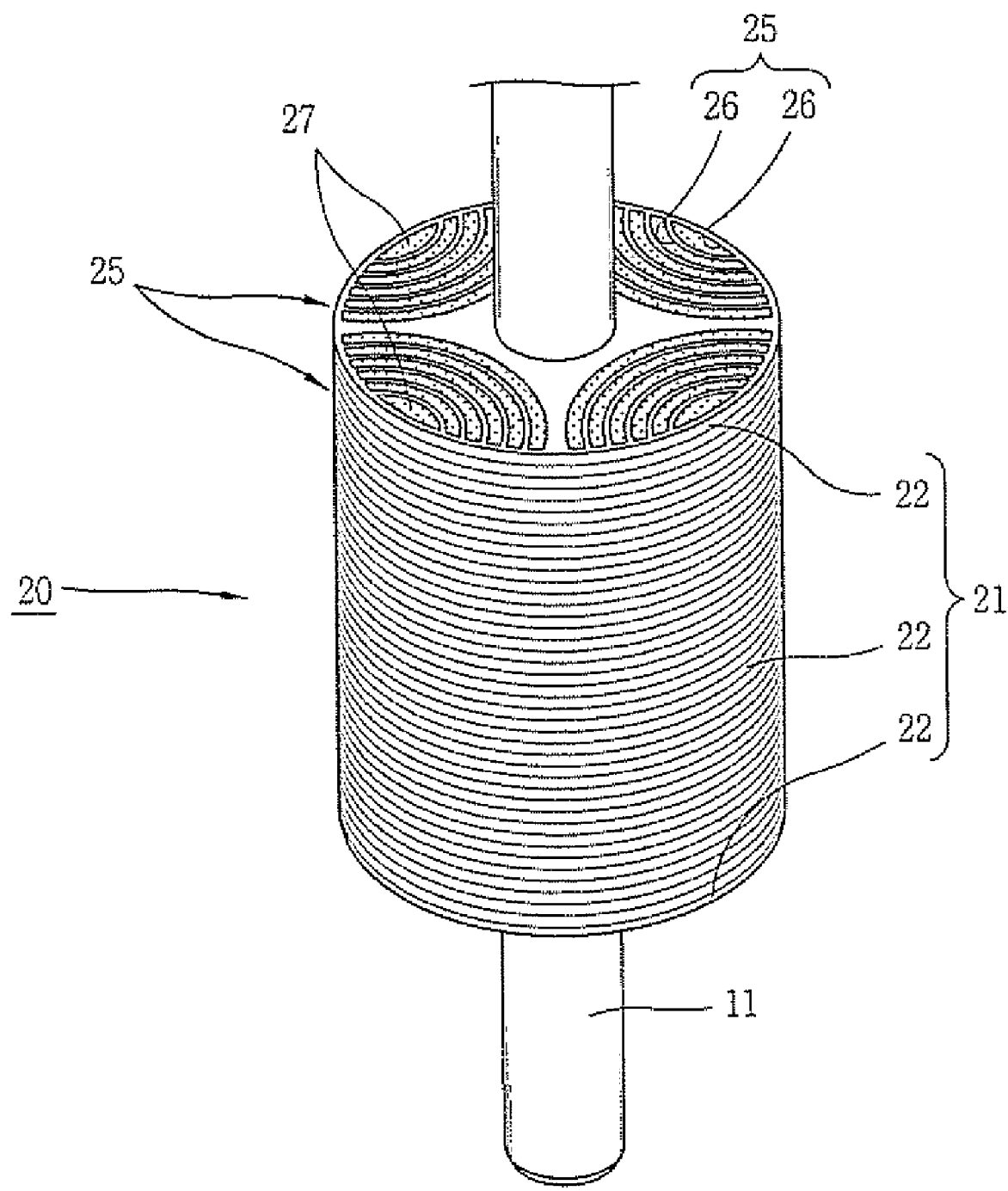
FIG. 1 is a perspective view showing a rotor of a flux barrier type synchronous reluctance motor in accordance with the conventional art.
Figure 2:
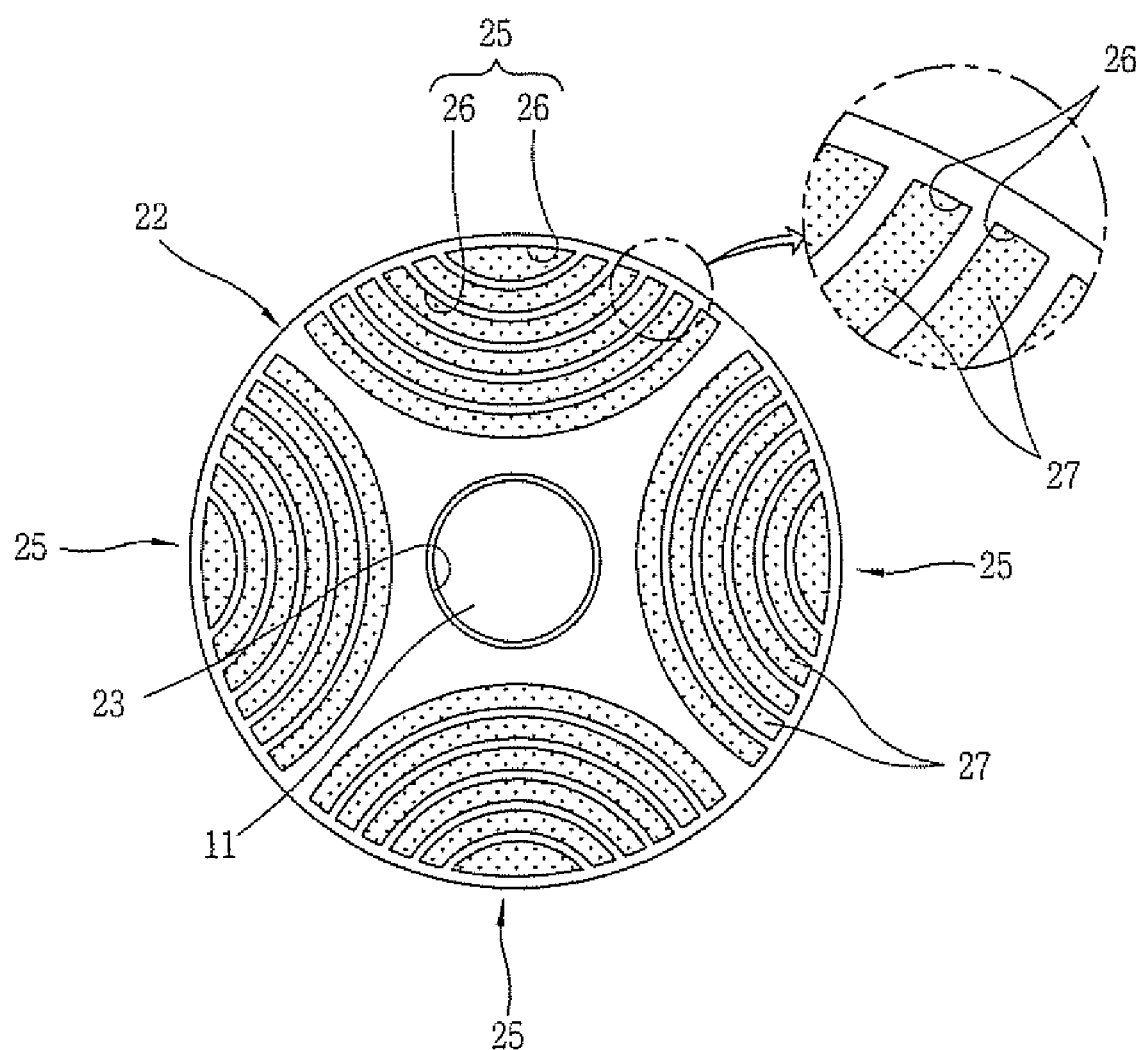
FIG. 2 is a plane view of FIG. 1.
Figure 3:
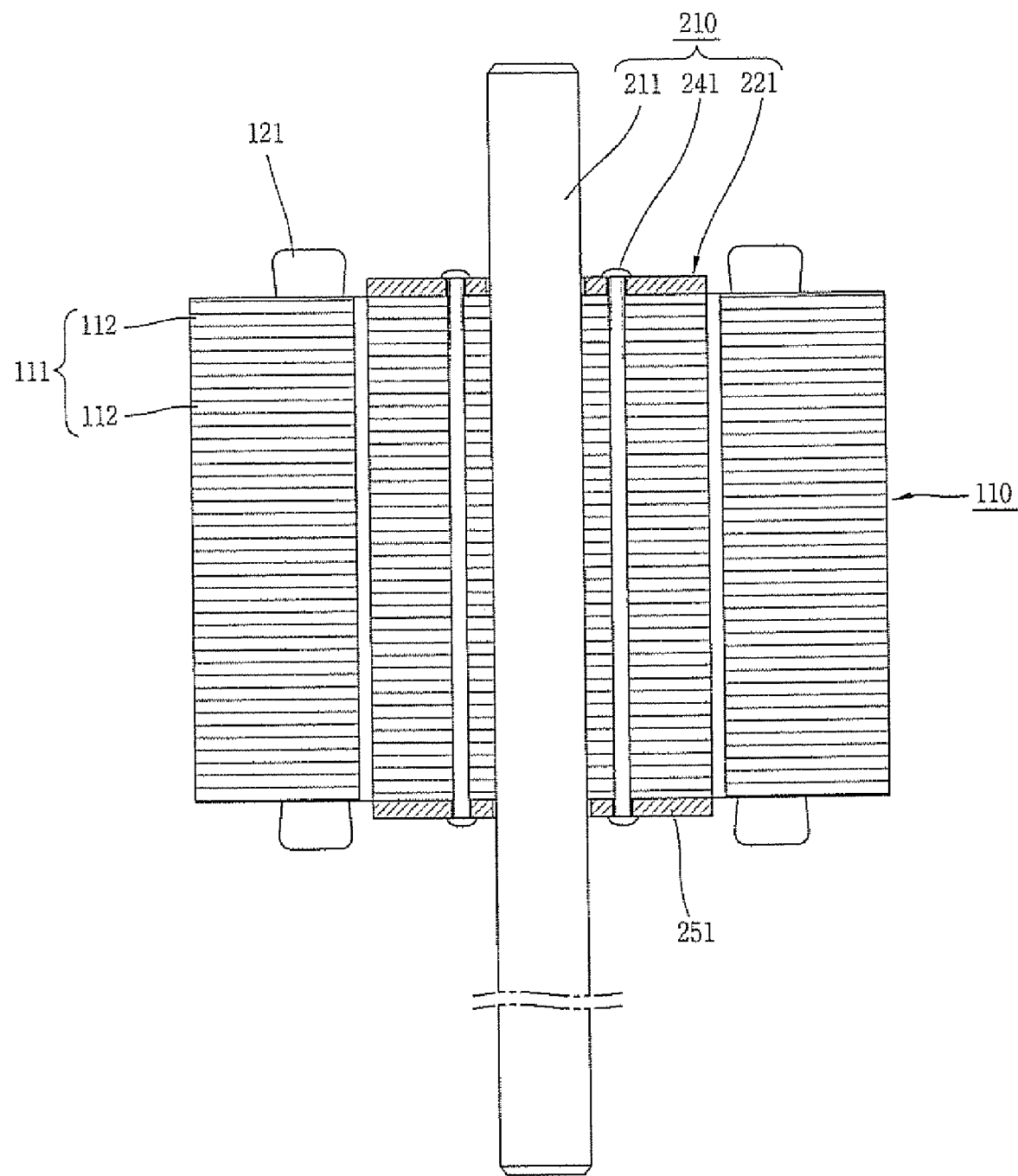
FIG. 3 is a sectional view showing a flux barrier type synchronous reluctance motor according to one embodiment of the present invention.
Figure 4:
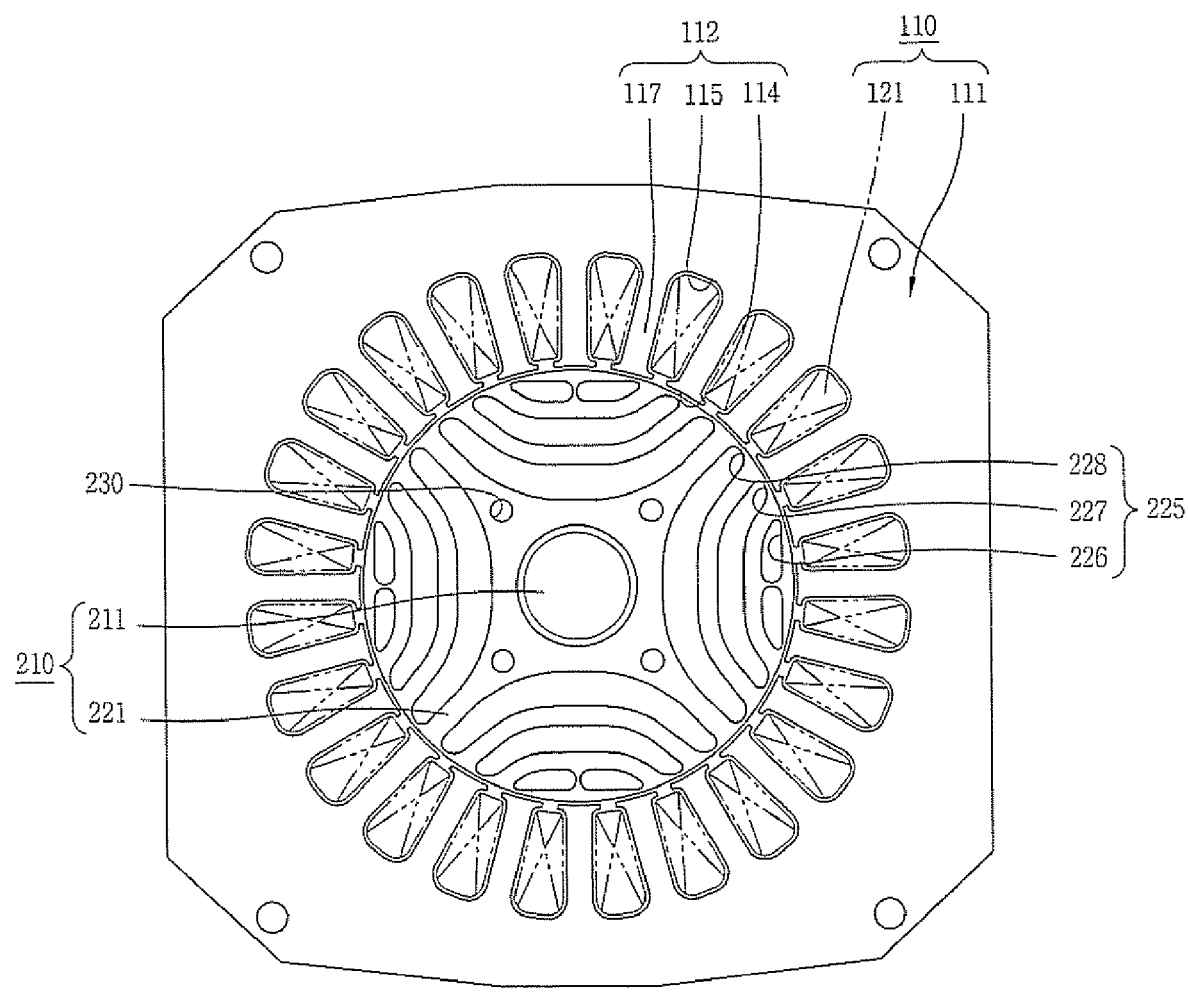
FIG. 4 is a plane view of FIG. 3.

As shown in FIGS. 3 and 4, a flux barrier type synchronous reluctance motor according to the present invention comprises: a stator 110 including a stator core 111 having slots 115 and teeth 117 alternately formed along an inner diameter, and a stator coil 121 wound on the slot 115; and a rotor 210 including a rotation shaft 211, a rotor core 221, and a coupling member 241, wherein the rotor core 221 is formed by laminating a plurality of steel plates 222 to one another, the steel plate 222 having a shaft hole 224 for inserting the rotation shaft 211, a plurality of flux barrier groups 225 spaced from one another in a circumferential direction and having a plurality of flux barriers 226, 227, and 228 spaced from one another in a radial direction, and a coupling hole 230 penetratingly-formed between the adjacent two flux barrier groups 225. Also, the coupling member 241 is inserted into the coupling hole 230 and fixes the steel plates 222.

The stator core 111 is provided with a receiving hole 114 for rotatably receiving the rotor 210 at a middle portion thereof. The stator core 111 is formed by laminating a plurality of steel plates 112 one another, each steel plate having slots 115 and teeth 117 alternately formed in a circumferential direction of the receiving hole 114. The numbers of the slots 115 and the teeth 117 are 24, respectively. Also, the stator coil 121 is wound on each slot 115.

Figure 5:
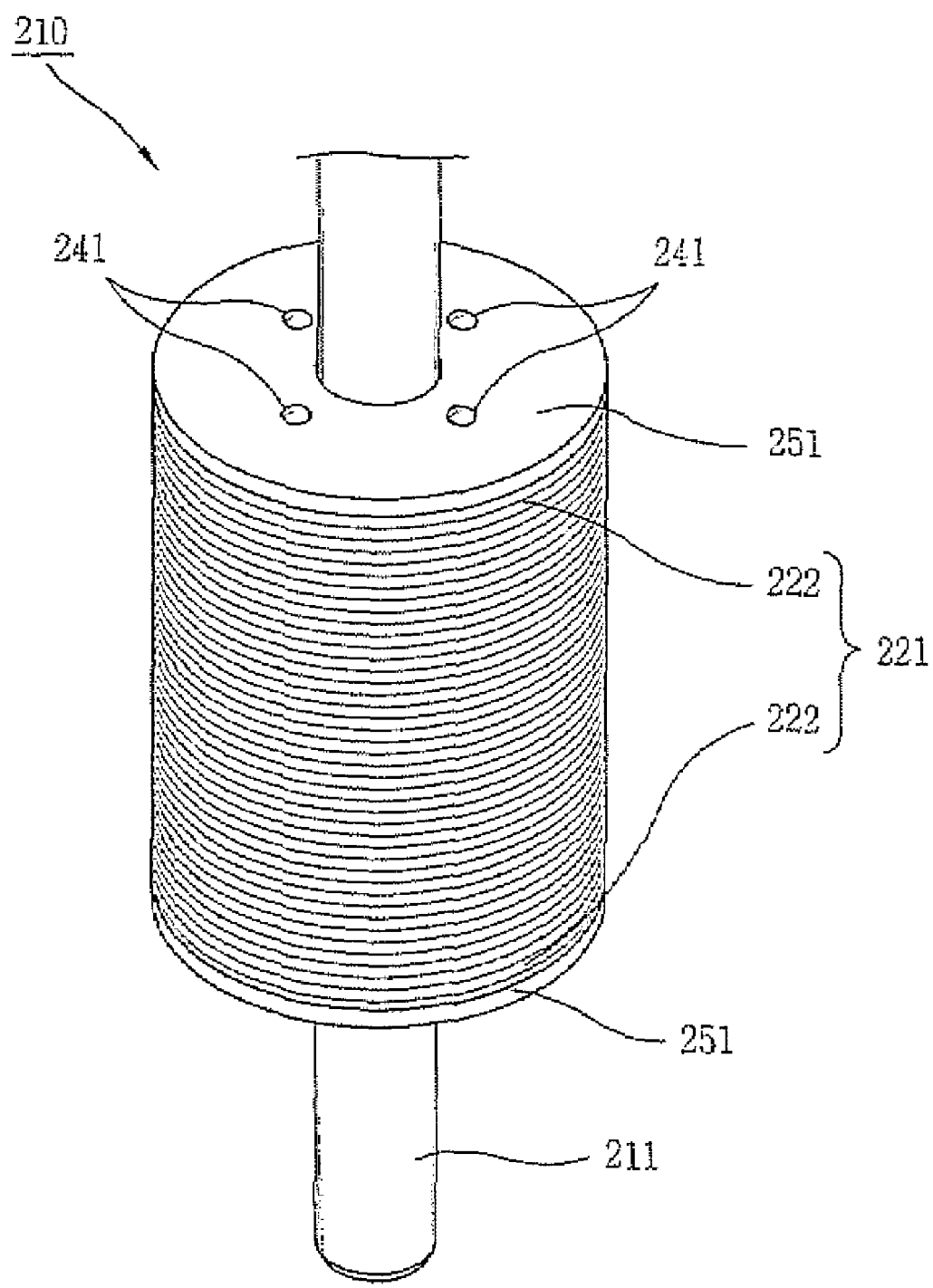
FIG. 5 is a perspective view of a rotor of FIG. 3.
Figure 6:
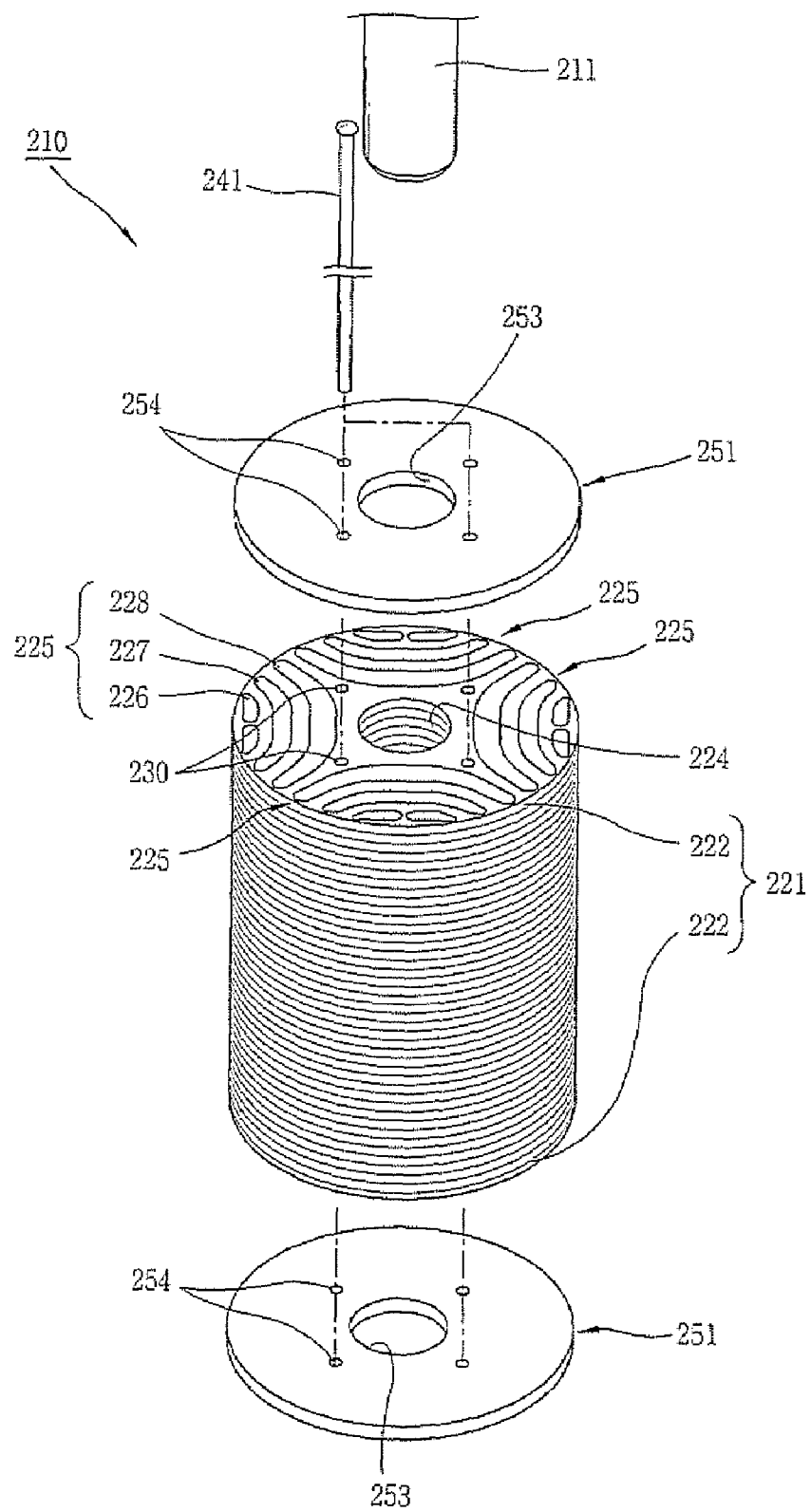
FIG. 6 is a disassembled perspective view of the rotor of FIG. 3.
Figure 7:
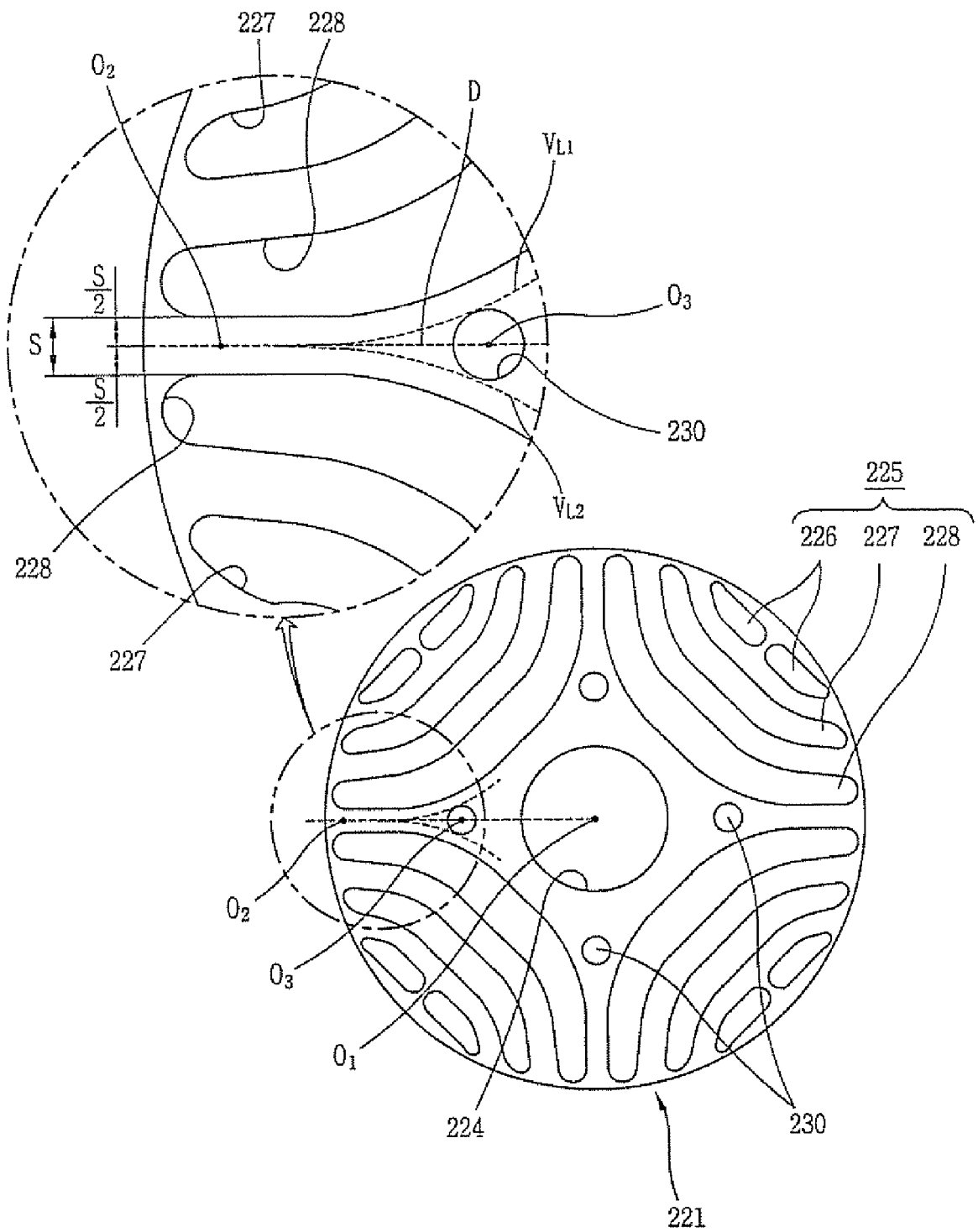
FIG. 7 is a plane view of a rotor core of FIG. 6.

As shown FIGS. 5 to 7, the rotor 210 comprises a rotation shaft 211, a rotor core 221 formed accordingly as a plurality of steel plates 222 are laminated to one another and rotated centering around the rotation shaft 211, and a coupling member 241 coupled to the rotor core 221 in an axial line direction for fixing each steel plate 222.

Each steel plate 222 is formed of a magnetic member, and has a disc shape of a certain diameter. The shaft hole 224 for inserting the rotation shaft 211 is penetratingly-formed in the middle of each of the steel plates 222. A plurality of flux barrier groups 225 are spaced from one another in a circumferential direction of the steel plate. Each of the flux barrier groups 225 has first to third flux barriers 226, 227, and 228 spaced from one another in a radial direction and having each middle portion protruded towards a center $O_1$ of the shaft hole 224.

The first flux barrier 226 is formed in one pair so as to be adjacent to an outer circumference of the steel plate 222 along a radial direction. The second flux barrier 227 is formed at an inner side of the first flux barrier 226 along the radial direction of the steel plate 222, and both ends thereof are adjacent to the outer circumference of the steel plate 222. Also, the third flux barrier 228 is formed at an inner side of the second flux barrier 227 along the radial direction of the steel plate 222, and both ends thereof are adjacent to the outer circumference of the steel plate 222.

A coupling hole 230 for inserting the coupling member 241 is penetratingly formed between the adjacent two flux barrier groups 225. The coupling member 241 implemented as a rivet having a circular sectional shape is inserted into each coupling hole 230.

As shown in FIG. 7, in order to increase a coupling intensity and to prevent a magnetic saturation occurrence, each coupling hole 230 is preferably formed so that a center thereof $O_3$ can be arranged on an axial line D for connecting a bisect point $O_2$ (S/2) that equally bisects a distance S between the third flux barriers 228 to a center $O_1$ of the shaft hole 224, and the coupling hole 230 is formed to be tangential to two virtual lines $V_{L1}$ and $V_{L2}$ formed along each inner circumference of the third flux barriers 228 with the same width corresponding to the S/2.

Figure 8:
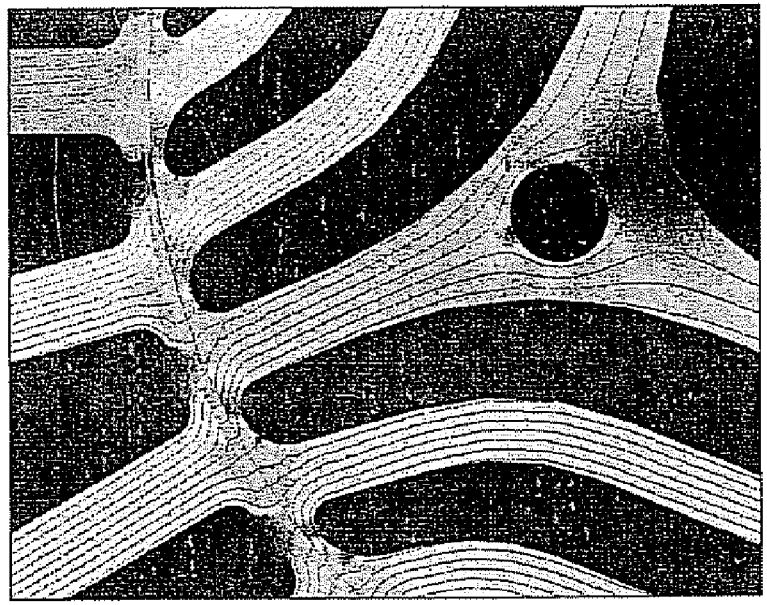
FIG. 8 is a view showing a flux generated by a stator coil of FIG. 4 according to the present invention.
Figure 9:
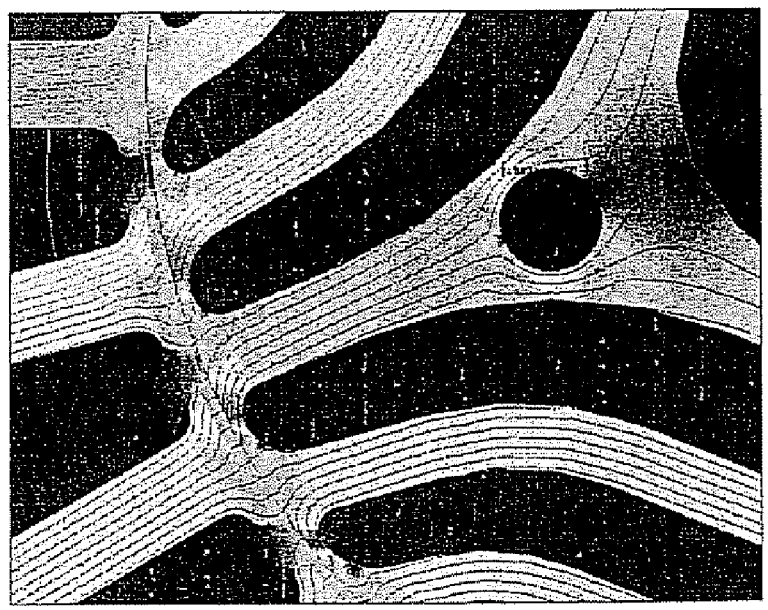
FIG. 9 is a view showing a comparison flux.

FIG. 8 is a view showing a flux generated by a stator coil of FIG. 4 according to the present invention, and FIG. 9 is a view showing a comparison flux is in which only a distance between the coupling hole 230 and the third flux barrier 228 has been changed under a state that other conditions are the same. Referring to FIG. 8, when the distance between the coupling hole 230 and the third flux barrier 228 is 1.47 mm corresponding to a half (S/2) of the distance S between the two third flux barriers 228, a magnetic flux density between the coupling hole and the third flux barrier 228 is 1.38 (T) and a torque is 37.19 (kgfcm). On the contrary, as shown in FIG. 9, when the distance between the coupling hole 230 and the third flux barrier 228 is 1.07 mm, a magnetic flux density between the coupling hole and the third flux barrier 228 is 1.88 (T) and a torque is 36.95 (kgfcm).

An end plate 251 having a shaft hole 253 of a disc shape for inserting the rotation shaft 211 and a coupling hole 254 of a disc shape for inserting the coupling member 241 is arranged at both sides of the rotor core 221 in an axial line direction of the rotation shaft 211, thereby covering the flux barriers 226, 227, and 228.

A process for forming the stator 110 will be explained. First, the steel plates 112 are laminated to one another so that the slots 115 and the teeth 117 formed at the steel plates 112 can be connected to one another, thereby forming the stator core 111. Then, the stator coil 121 is wound on each slot 115.

A process for forming the rotor 210 will be explained. First, the steel plates 222 are laminated to one another so that the shaft holes 224 and the flux barriers 226, 227, and 228 formed at the steel plates 222 can be connected to one another, thereby forming the rotor core 221. Then, the end plate 251 is arranged at both ends of the rotor core 221 along the lamination direction, thereby connecting the rotor core 221, the shaft holes 224 and 253 of the end plate 251, and the coupling holes 230 and 254 one another. The coupling member 241 is inserted into the coupling holes 230 and 254, and the rotation shaft 211 is inserted into the shaft holes 224 and 253.

After forming the stator 110 and the rotor 210, the rotor 210 is rotatably inserted into the stator 110 thereby completing the assembly. When power is applied to the stator coil 121, a smooth flux flow is generated as shown in FIG. 8 thereby to prevent a performance degradation of the motor.

Figure 10:
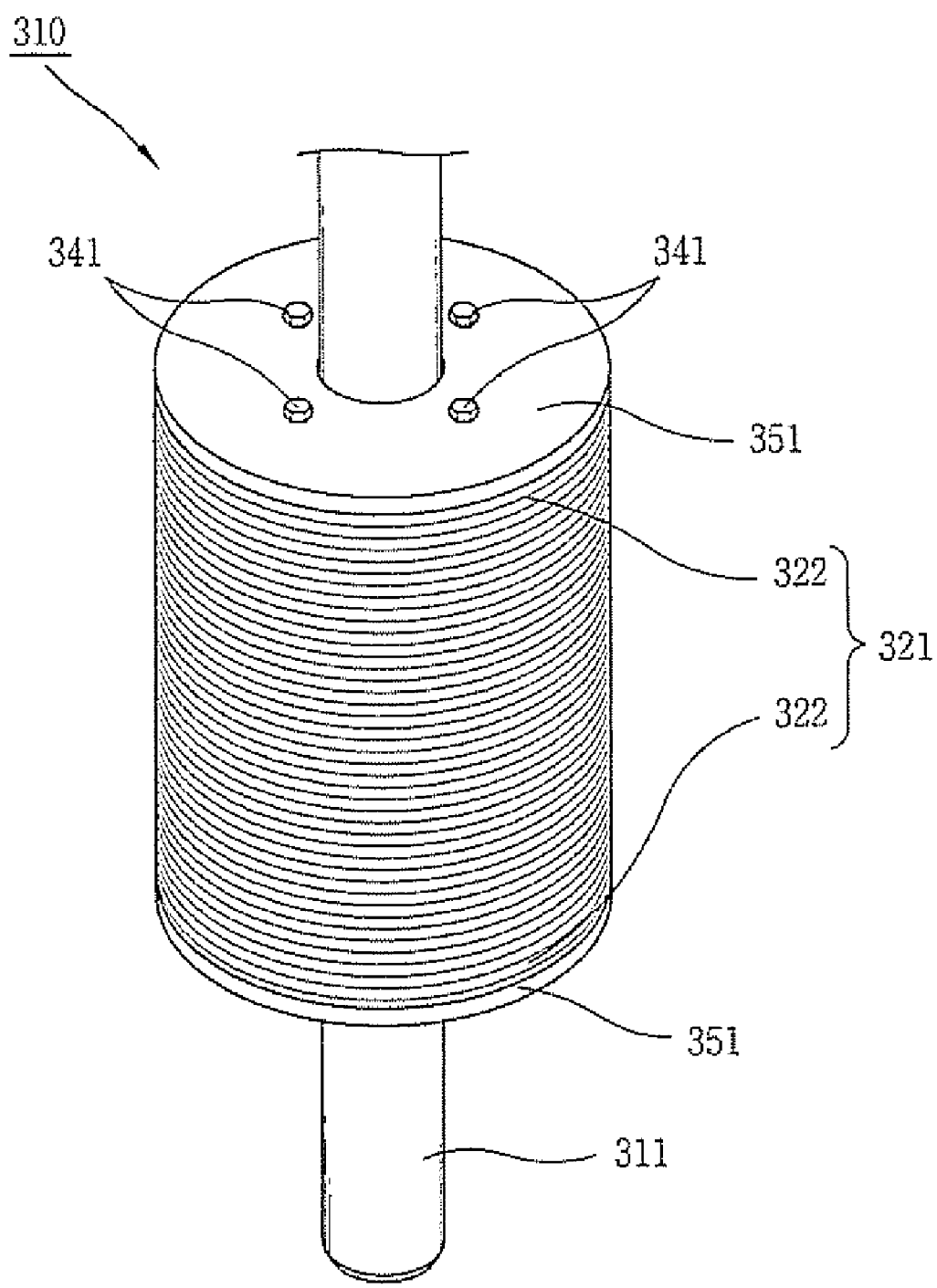
FIG. 10 is a perspective view showing a rotor of the flux barrier type synchronous reluctance motor according to a first embodiment of the present invention.
Figure 11:
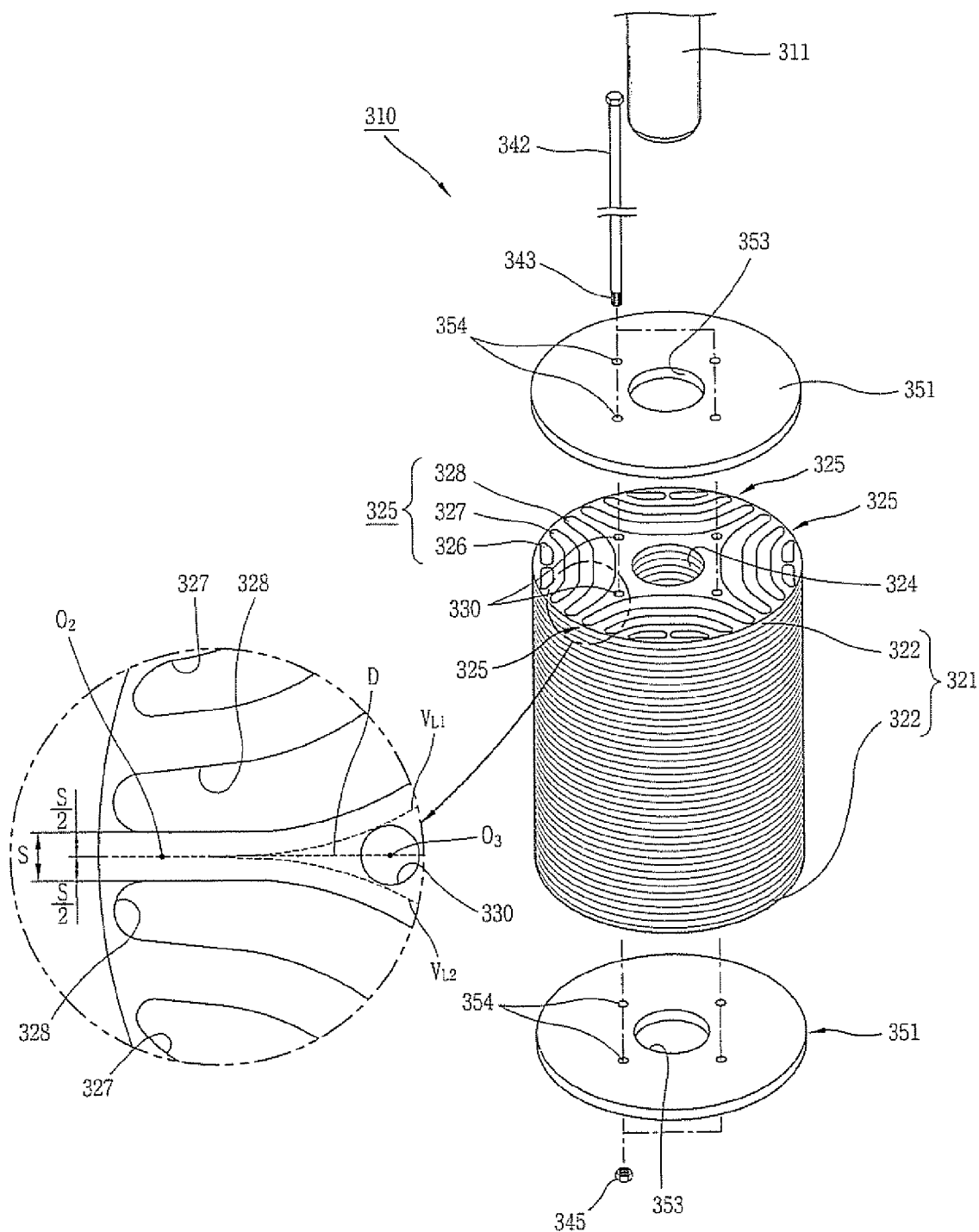
FIG. 11 is a disassembled perspective view of FIG. 10.

FIG. 10 is a perspective view showing a rotor of a flux barrier type synchronous reluctance motor according to a first embodiment of the present invention, and FIG. 11 is a disassembled perspective view of FIG. 10. As shown, a rotor 310 of a flux barrier type synchronous reluctance motor comprises a rotation shaft 311; a rotor core 321 formed by laminating a plurality of steel plates 322 one another, the steel plate 322 having coupling holes 330 formed between a plurality of flux barrier groups 325 spaced from one another in a circumferential direction; and a coupling member 341 inserted into each of the coupling holes 330.

Each of the steel plates 322 is formed of a magnetic member, and has a disc shape of a certain diameter. A shaft hole 324 for inserting the rotation shaft 311 is penetratingly-formed in the middle of each of the steel plates 322. A plurality of flux barrier groups 325 are spaced from one another in a circumferential direction of the shaft hole 324. Each of the flux barrier groups 325 has first to third flux barriers 326, 327, and 328 spaced from one another in a radial direction and having each middle portion protruded towards a center $O_1$ of the shaft hole 324.

The first flux barrier 326 is formed in one pair so as to be adjacent to an outer circumference of the steel plate 322 along a radial direction. The second flux barrier 327 is formed at an inner side of the first flux barrier 326 along the radial direction of the steel plate 322, and both ends thereof are adjacent to the outer circumference of the steel plate 322. Also, the third flux barrier 328 is formed at an inner side of the second flux barrier 327 along the radial direction of the steel plate 322, and both ends thereof are adjacent to the outer circumference of the steel plate 322.

A coupling hole 330 for inserting the coupling member 341 implemented as a fixing bolt 342 and a nut 345 is penetratingly formed between the adjacent two flux barrier groups 325.

As aforementioned in FIGS. 3 to 9, in order to increase a coupling intensity and to prevent a magnetic saturation occurrence, each coupling hole 330 is preferably formed so that a center thereof $O_3$ can be arranged on an axial line D for connecting a bisect point $O_2$ (S/2) that equally bisects a distance S between the third flux barriers 328 to a center $O_1$ of the shaft hole 324, and the coupling hole 330 is arranged to be tangential to two virtual lines $V_{L1}$ and $V_{L2}$ formed along each inner circumference of the third flux barriers 328 with the same width corresponding to the S/2.

Each end plate 351 having a shaft hole 353 of a disc shape for inserting the rotation shaft 311 and a coupling hole 354 of a disc shape for inserting the coupling member 341 is arranged at both sides of the rotor core 321 in an axial line direction of the rotation shaft 311, thereby covering the flux barriers 326, 327, and 328.

First, the steel plates 322 are laminated to one another so that the shaft holes 324 and the flux barriers 326, 327, and 328 formed at the steel plates 322 can correspond to one another, thereby forming the rotor core 321. Then, the end plate 351 is arranged at both ends of the rotor core 321 along the lamination direction, thereby connecting the rotor core 321, the shaft holes 324 and 353 of the end plate 351, and the coupling holes 330 and 354 one another. The fixing bolt 342 of the coupling member 341 is inserted into the coupling holes 330 and 354, and the nut 345 is coupled to a male screw portion 343 of the fixing bolt 342, thereby coupling the end plate 351 and the rotor core 321. Then, the rotation shaft 311 is inserted into the shaft holes 324 and 353, thereby completing the assembly.

Figure 12:
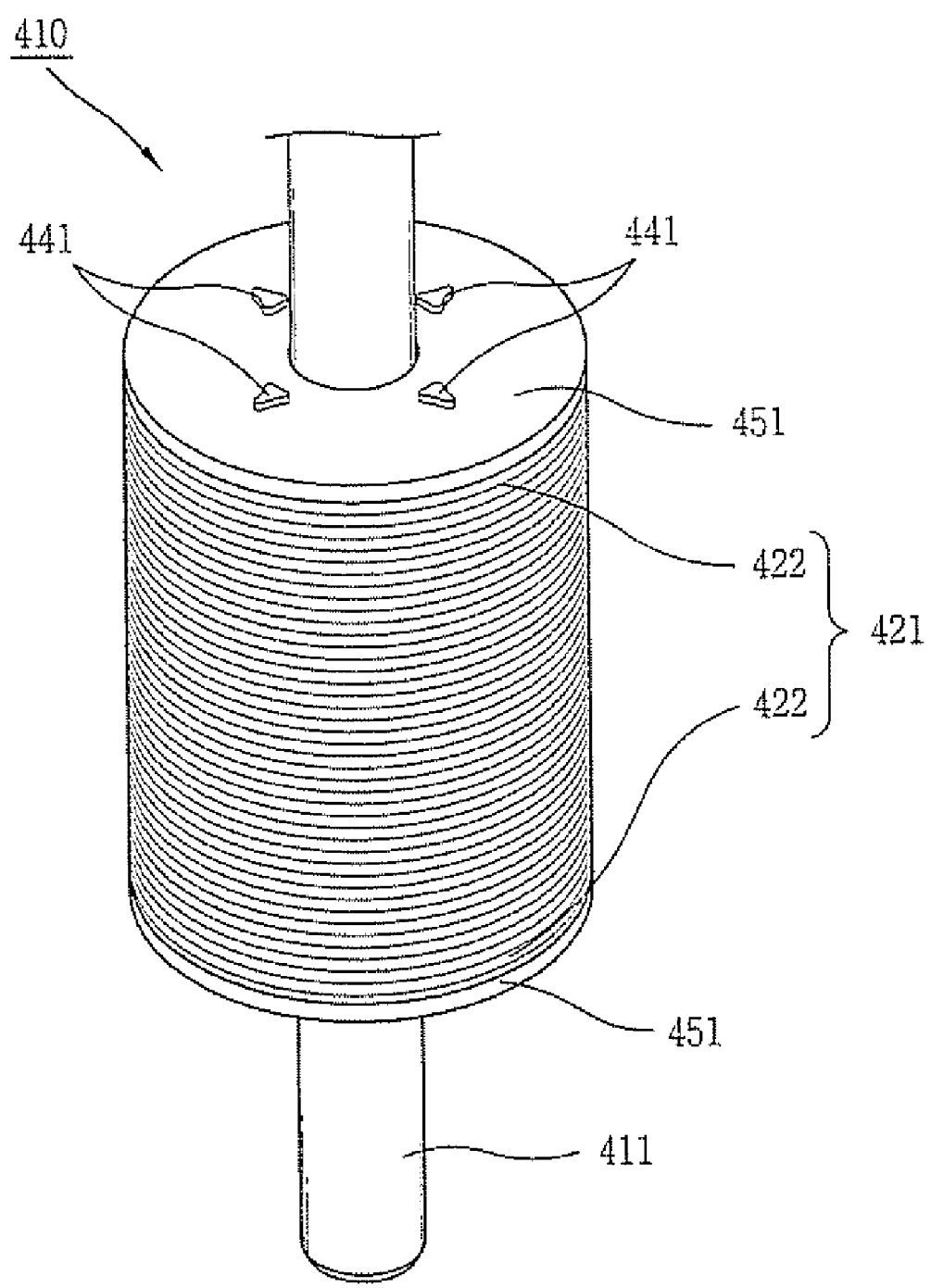
FIG. 12 is a perspective view showing a rotor of a flux barrier type synchronous reluctance motor according to another embodiment of the present invention.
Figure 13:
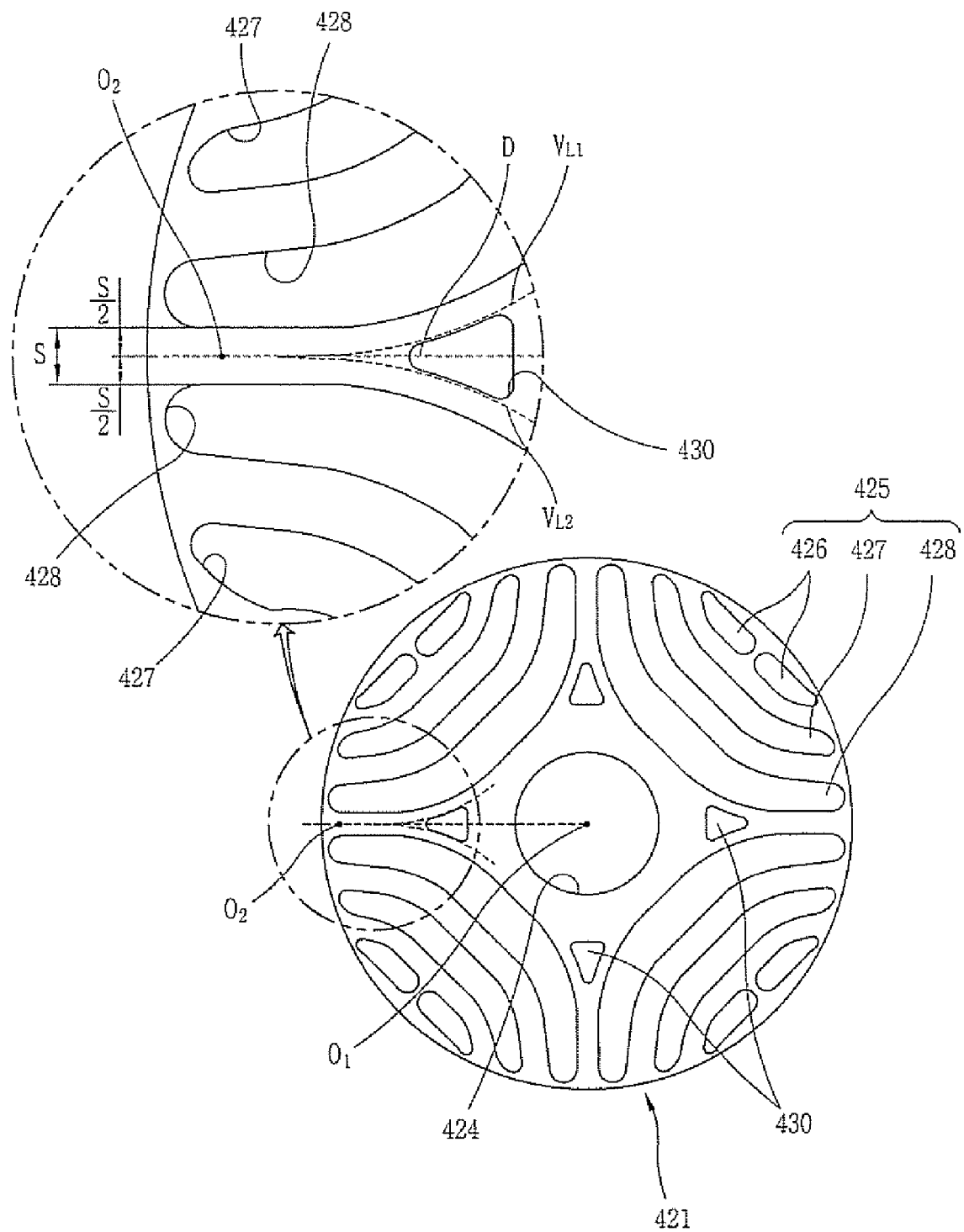
FIG. 13 is a plane view of FIG. 12.
Figure 14:
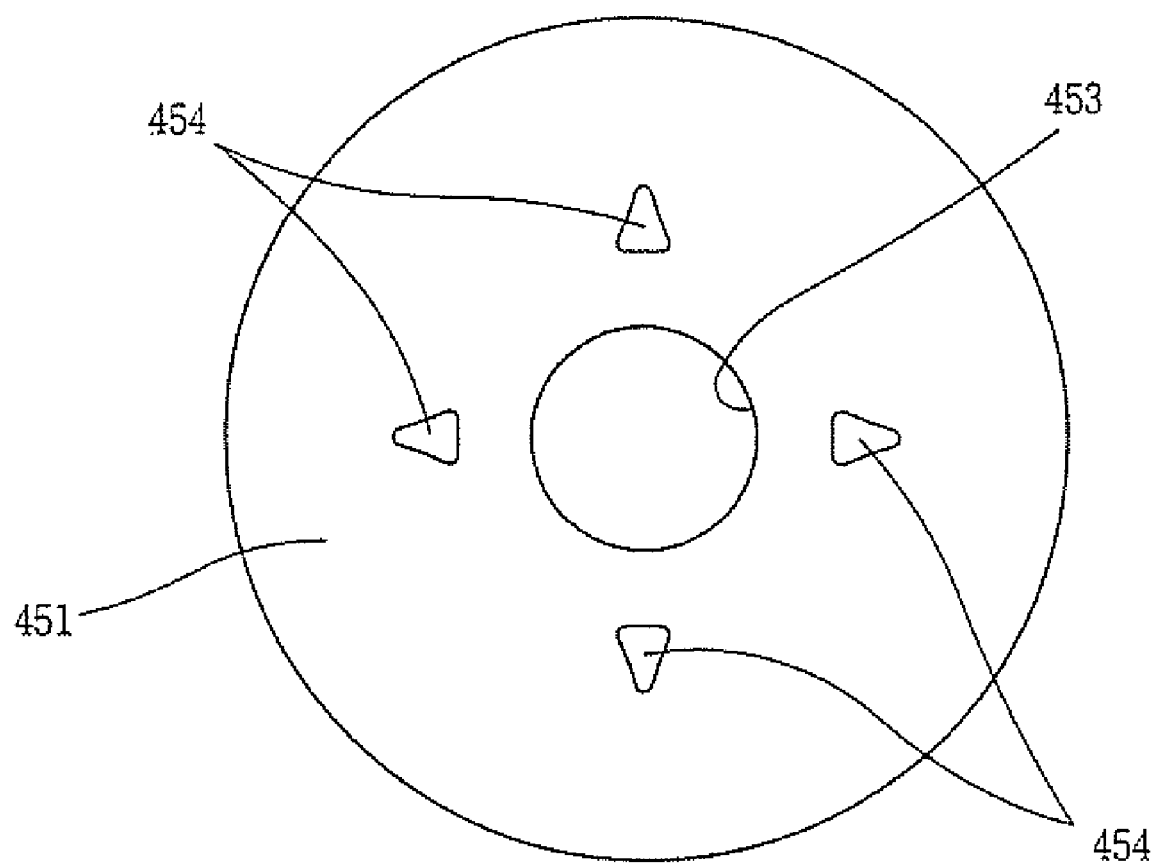
FIG. 14 is a plane view showing an end plate of FIG. 12.

FIG. 12 is a perspective view showing a rotor of a flux barrier type synchronous reluctance motor according to another embodiment of the present invention, FIG. 13 is a plane view of FIG. 12, and FIG. 14 is a plane view showing an end plate of FIG. 12. As shown, a rotor 410 of a flux barrier type synchronous reluctance motor comprises a rotation shaft 411; a rotor core 421 formed by laminating a plurality of steel plates 422 one another, the steel plate 422 having coupling holes 430 formed between a plurality of flux barrier groups 425 spaced from one another in a circumferential direction; and a plurality of coupling member 441, each inserted into the coupling hole 430.

Each of the steel plates 422 is formed of a magnetic member, and has a disc shape of a certain diameter. A shaft hole 424 for inserting the rotation shaft 411 is penetratingly-formed in the middle of each of the steel plates 422. A plurality of flux barrier groups 425 are spaced from one another in a circumferential direction of the shaft hole 424. Each of the flux barrier groups 425 has first to third flux barriers 426, 427, and 428 spaced from one another in a radial direction and having each middle portion protruded towards a center $O_1$ of the shaft hole 424.

The first flux barrier 426 is formed in one pair so as to be adjacent to an outer circumference of the steel plate 422 along a radial direction. The second flux barrier 427 is formed at an inner side of the first flux barrier 426 along the radial direction of the steel plate 422, and both ends thereof are adjacent to the outer circumference of the steel plate 422. Also, the third flux barrier 428 is formed at an inner side of the second flux barrier 427 along the radial direction of the steel plate 422, and both ends thereof are adjacent to the outer circumference of the steel plate 422.

The coupling hole 430 is penetratingly formed between the adjacent two flux barrier groups 425, and the coupling member 441 implemented as a rivet having a triangular sectional surface is inserted into the coupling hole 430.

As shown in FIG. 13, in order to increase a coupling intensity and to prevent a magnetic saturation occurrence, each coupling hole 430 is preferably formed on an axial line D for connecting a bisect point $O_2$ (S/2) that equally bisects a distance S between the third flux barriers 428 to a center $O_1$ of the shaft hole 424. Also, the coupling hole 430 is formed to have a triangular shape so that it can be tangential to two virtual lines $V_{L1}$ and $V_{L2}$ formed along each inner circumference of the third flux barriers 428 with the same width corresponding to the S/2. Herein, two sides of the coupling hole 430 can be formed as a curved line parallel to the two virtual lines $V_{L1}$ and $V_{L2}$. The coupling member 441 can be formed as a rivet having a sectional shape corresponding to that of the coupling hole 430, or can be formed by a die-casting, etc.

As shown in FIG. 14, each end plate 451 having a shaft hole 453 of a disc shape for inserting the rotation shaft 411 and a coupling hole 454 of a disc shape for inserting the coupling member 441 is arranged at both sides of the rotor core 421 in an axial line direction of the rotation shaft 411, thereby covering the flux barriers 426, 427, and 428.

First, the steel plates 422 are laminated to one another so that the shaft is holes 424 and the flux barriers 426, 427, and 428 formed at the steel plates 422 can be connected to one another, thereby forming the rotor core 421. Then, the end plate 451 is arranged at both ends of the rotor core 421 along the lamination direction. The coupling member 441 is inserted into each of the coupling holes 430, and the rotation shaft 311 is inserted into the shaft hole 424, thereby completing the entire assembly.

As aforementioned, in the flux barrier type synchronous reluctance motor and the rotor thereof according to the present invention, the production cost and the entire weight are decreased, and the fabrication process is facilitated with a shortened fabrication time.

Furthermore, the coupling hole is positioned on an axis that equally bisects the distance (S) between the adjacent two flux barrier groups, and the coupling hole is tangential to two virtual lines formed along each inner circumference of the flux barrier groups with the same width corresponding to the S/2. Accordingly, a large coupling intensity is obtained and a magnetic saturation does not occur, thereby preventing a function degradation of the motor.

Furthermore, the end plate is further provided at both ends of the rotor core along an axial line direction of the rotor core, thereby preventing a deformation of the rotor core and a clearance occurrence at the ends of the rotor core.

Furthermore, the coupling hole is positioned on an axis that equally bisects the distance (S) between the adjacent two flux barrier groups, and the coupling hole is positioned at an inner side of two virtual lines formed along each inner circumference of the two flux barrier groups with the same width corresponding to the S/2 as a triangular shape. Accordingly, a large coupling intensity is obtained and a function degradation of the motor is prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A rotor of a flux barrier type synchronous reluctance motor, comprising:
   a rotation shaft;
   a rotor core formed as a plurality of steel plates laminated to one another, the steel plates having a shaft hole through which the rotation shaft is inserted, a plurality of flux barrier groups spaced from one another in a circumferential direction and having a plurality of flux barriers spaced from one another in a radial direction, and a coupling hole penetratingly-formed between two adjacent flux barrier groups; and
   a coupling member inserted into the coupling hole which fixes the steel plates,
   wherein the coupling hole is tangential to two virtual lines formed along inner circumferences of the two adjacent flux barrier groups with a same width corresponding to a half of a distance between the two adjacent flux barrier groups.

2. The rotor of claim 1, wherein the coupling hole is formed so that a center thereof can be arranged on an axial line which connects a bisect point that equally bisects a distance between the two adjacent flux barrier groups to a center of the steel plates.

3. The rotor of claim 2, wherein the flux barrier groups are formed in a circumferential direction of each of the steel plates so as to form four polarities.

4. The rotor of claim 3, wherein each of the flux barrier groups includes first to third flux barriers of which both end portions are adjacent to a circumference of the steel plate, and the coupling hole is formed between the third flux barriers of each flux barrier group.

5. The rotor of claim 1, further comprising end plates having a shaft hole and a coupling hole respectively corresponding to the shaft hole and the coupling hole of the rotor core, and coupled to both ends of the rotor core in an axial line direction of the rotation shaft in order to cover the flux barriers.

6. The rotor of claim 1, wherein the coupling hole has a triangular shape.

7. The rotor of claim 6, further comprising end plates having a shaft hole and a coupling hole respectively corresponding to the shaft hole and the coupling hole of the rotor core, and coupled to both ends of the rotor core in an axial line direction of the rotation shaft in order to cover the flux barriers.

8. The rotor of claim 1, wherein the coupling member is implemented as a rivet.

9. The rotor of claim 1, wherein the coupling member includes a fixing bolt inserted to the coupling hole, and a nut coupled to an end of the fixing bolt.

10. A rotor of a flux barrier type synchronous reluctance motor, comprising:
    a rotation shaft;
    a rotor core formed as a plurality of steel plates are laminated to one another, the steel plates having a shaft hole through which the rotation shaft is inserted, a plurality of flux barrier groups spaced from one another in a circumferential direction and having a plurality of flux barriers spaced from one another in a radial direction, and a plurality of coupling holes respectively formed to be tangential to two virtual lines formed along inner circumferences of two adjacent flux barrier groups with a same width corresponding to a half of a distance between the two adjacent flux barrier groups; and
    a coupling member inserted into the coupling hole which fixes the steel plates.

11. The rotor of claim 10, further comprising end plates having a shaft hole and a coupling hole respectively corresponding to the shaft hole and the coupling hole of the rotor core, and coupled to both ends of the rotor core in an axial line direction of the rotation shaft in order to cover the flux barriers.

12. The rotor of claim 10, wherein the flux barrier groups are formed in a circumferential direction of the steel plates so as to form four polarities, and each of the flux barrier groups includes first to third flux barriers of which both end portions are adjacent to a circumference of the steel plate.

13. A flux barrier type synchronous reluctance motor, comprising:
    a stator including a stator core having slots and teeth alternately formed along an inner diameter, and a stator coil wound on the slot; and
    a rotor including a rotation shaft, a rotor core, and a plurality of coupling members,
    wherein the rotor core is formed by laminating a plurality of steel plates to one another, the steel plates having a shaft hole through which the rotation shaft is inserted, a plurality of flux barrier groups spaced from one another in a circumferential direction and having a plurality of flux barriers spaced from one another in a radial direction, and a coupling hole penetratingly-formed between two adjacent flux barrier groups,
    wherein each of the coupling members is inserted into the coupling hole and fixes the steel plates, and
    wherein the coupling hole is tangential to two virtual lines formed along inner circumferences of the two adjacent flux barrier groups with a same width corresponding to a half of a distance between the two adjacent flux barrier groups.

14. The motor of claim 13, further comprising end plates having a shaft hole and a coupling hole respectively corresponding to the shaft hole and the coupling hole of the rotor core, and coupled to both ends of the rotor core in an axial line direction of the rotation shaft in order to cover the flux barriers.

15. The motor of claim 13, wherein the flux barrier groups are formed in a circumferential direction of the steel plates so as to form four polarities, and each of the flux barrier groups includes first to third flux barriers of which both end portions are adjacent to a circumference of the steel plate.

16. The motor of claim 13, wherein the coupling hole has a triangular shape.

17. The motor of claim 16, further comprising end plates having a shaft hole and a coupling hole respectively corresponding to the shaft hole and the coupling hole of the rotor core, and coupled to both ends of the rotor core in an axial line direction of the rotation shaft in order to cover the flux barriers.

18. The motor of claim 16, wherein the flux barrier groups are formed in a circumferential direction of the steel plates so as to form four polarities, and each of the flux barrier groups includes first to third flux barriers of which both end portions are adjacent to a circumference of the steel plates.

* * * * *